United States Patent
Raeder (10) Patent No.: US 11,958,348 B2
(45) Date of Patent: Apr. 16, 2024

(54) DRIVE UNIT FOR A DRIVE AXLE OF A VEHICLE

(71) Applicant: ZF Friedrichshafen AG, Friedrichshafen (DE)

(72) Inventor: Niclas Raeder, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/192,018

(22) Filed: Mar. 29, 2023

(65) Prior Publication Data
US 2023/0311628 A1 Oct. 5, 2023

(30) Foreign Application Priority Data

Mar. 30, 2022 (DE) ............ 10 2022 203 097.4

(51) Int. Cl.
*B60K 17/16* (2006.01)
*B60K 1/02* (2006.01)

(52) U.S. Cl.
CPC ............ *B60K 1/02* (2013.01); *B60K 17/16* (2013.01)

(58) Field of Classification Search
CPC .. B60K 1/02; B60K 17/16; F16H 3/72; F16H 3/727; F16H 3/728; F16H 48/08
See application file for complete search history.

(56) References Cited

U.S. PATENT DOCUMENTS

| | | | |
|---|---|---|---|
| 2,037,126 A | 4/1936 | Ford | |
| 5,879,265 A | 3/1999 | Bek | |
| 6,557,656 B2 | 5/2003 | Haniu et al. | |
| 7,220,203 B2 | 5/2007 | Holmes et al. | |
| 7,363,996 B2 | 4/2008 | Kamada et al. | |
| 7,387,585 B2 | 6/2008 | Bucknor et al. | |
| 7,479,081 B2 | 1/2009 | Holmes | |

(Continued)

FOREIGN PATENT DOCUMENTS

| CN | 206749500 U | 12/2017 |
|---|---|---|
| CN | 107985068 A | 5/2018 |

(Continued)

OTHER PUBLICATIONS

United States Patent and Trademark Office, Non-Final Office Action issued in U.S. Appl. No. 17/764,824 (dated May 8, 2023).

(Continued)

*Primary Examiner* — Edwin A Young
(74) *Attorney, Agent, or Firm* — Finch & Maloney PLLC (57) ABSTRACT

Disclosed is a drive unit for a drive axle of a vehicle having a first and second electric machines, a differential and a transmission with first and a second transmission input shafts, a transmission output shaft, at least a first planetary gearset. A first shifting unit has three shift positions. In a first shift position, a second element is connected to a rotationally fixed component. In a second shift position two of the three elements of the first planetary gearset are connected rotationally fixed to one another. A second shifting unit has exactly three shift positions. In a first shift position a first transmission input shaft and a second transmission input shaft are connected rotationally fixed to one another. In a second shift position the second transmission input shaft is connected at least indirectly to the second element of the first planetary gearset.

15 Claims, 3 Drawing Sheets

(56) References Cited

U.S. PATENT DOCUMENTS

| | | | |
|---|---|---|---|
| 7,594,869 B2 | 9/2009 | Holmes | |
| 7,695,387 B2 | 4/2010 | Oba | |
| 7,967,711 B2 | 6/2011 | Conlon et al. | |
| 8,091,661 B2 | 1/2012 | Oba et al. | |
| 8,512,187 B2 | 8/2013 | Puiu et al. | |
| 9,566,857 B1 | 2/2017 | Pritchard et al. | |
| 10,968,983 B2 | 4/2021 | Hara et al. | |
| 11,002,350 B2 | 5/2021 | Waltz | |
| 11,124,064 B2 | 9/2021 | Kaltenbach et al. | |
| 11,156,280 B2 | 10/2021 | Kurth | |
| 11,364,784 B2 | 6/2022 | Kaltenbach et al. | |
| 11,365,785 B2 | 6/2022 | Kumar et al. | |
| 11,472,277 B2 | 10/2022 | Glückler et al. | |
| 2006/0025263 A1* | 2/2006 | Sowul | B60K 6/40 475/5 |
| 2011/0259657 A1 | 10/2011 | Fuechtner | |
| 2021/0188066 A1* | 6/2021 | McGrew | B60K 17/08 |
| 2021/0372506 A1* | 12/2021 | McGrew, Jr. | F16H 3/725 |
| 2022/0364631 A1 | 11/2022 | Glückler et al. | |

FOREIGN PATENT DOCUMENTS

| | | |
|---|---|---|
| CN | 208630340 U | 3/2019 |
| DE | 1505723 | 7/1970 |
| DE | 10 2011 088 647 A1 | 6/2013 |
| DE | 10 2012 204 717 A1 | 9/2013 |
| DE | 10 2015 215 393 A1 | 9/2016 |
| DE | 10 2018 001 508 B3 | 5/2019 |
| DE | 10 2017 011 387 A1 | 6/2019 |
| DE | 2020/030212 A1 | 2/2020 |
| DE | 10 2020 203 669 A1 | 9/2021 |
| DE | 10 2020 215 124 A1 | 6/2022 |
| WO | 2019/115204 A1 | 6/2019 |
| WO | 2021/063789 A1 | 4/2021 |

OTHER PUBLICATIONS

German Patent Office, German Search Report issued in German patent application No. 10 2022 203 097.4 (dated Nov. 7, 2022).

German Patent Office, German Search Report issued in German patent application No. 10 2022 203 098.2 (dated Nov. 8, 2022).

German Patent Office, Search Report issued in German patent application No. 10 2022 209 050.0 (dated Jul. 24, 2023).

* cited by examiner

DRIVE UNIT FOR A DRIVE AXLE OF A VEHICLE

RELATED APPLICATIONS

This application claims the benefit of and right of priority under 35 U.S.C. § 119 to German Patent Application no. 10 2022 203 097.4, filed on 30 Mar. 2022, the contents of which are incorporated herein by reference in its entirety.

FIELD OF THE DISCLOSURE

The invention relates to a drive unit for a drive axle of a vehicle, in particular an electric axle drive. Furthermore, the invention relates to a vehicle with a drive axle comprising such a drive unit.

BACKGROUND

For example, WO 2021/063789 A1 describes a drive axle of an electric vehicle, with a first and a second drive wheel, a first and a second electric machine, a transmission with a transmission input shaft and a transmission output shaft, and an axle differential with a differential input and two differential output shafts. The first electric machine is connected to the transmission input shaft and the transmission output shaft is connected to the differential input. The second electric machine can be linked in, if necessary, as an additional drive.

SUMMARY

The purpose of the present invention is to provide an alternative drive unit for a drive axle of a vehicle. In particular, the drive unit should have a compact and energy-efficient structure. This objective is achieved by a drive unit for a drive axle of a vehicle as variously disclosed herein. Advantages and further embodiments will be apparent from the description given below and the figures.

A drive unit according to the invention for a drive axle of a vehicle comprises a first electric machine, a second electric machine, a differential with a differential input, and two differential output shafts which are designed in each case to be in driving connection with a respective drive wheel of the drive axle, and a transmission comprising a first transmission input shaft for connecting the first electric machine, a second transmission input shaft for connecting the second electric machine, a transmission output shaft for connecting the differential, at least one first planetary gearset with a first element, a second element and a third element, a shifting unit with exactly three shift positions such that in a first shift position of the first shifting unit a second element of the first planetary gearset is connected to a rotationally fixed component, whereas in a second shift position of the first shifting unit two of the three elements of the first planetary gearset are connected rotationally fixed to one another, and whereas the third shift position of the first shifting unit is a neutral position, and a second shifting unit with exactly three shift positions, such that in a first shift position of the second shifting unit the first transmission input shaft and the second transmission input shaft are connected to one another in a rotationally fixed manner, whereas in a second shift position of the second shifting unit the second transmission input shaft is connected at least indirectly with the second element of the first planetary gearset, and whereas the third shift position of the second shifting unit is a neutral position.

The transmission enables the connection of two electric machines to supply drive power via the two transmission shafts. The transmission is in driving connection with the differential in the form of an axle differential, while the differential itself is designed to connect two output shafts, which are provided as drive outputs, to the respective drive wheels of the drive axle of the vehicle. In particular, the drive unit is used in an electric drive axle for an electric vehicle. The transmission has three gears, thereby achieving high energy efficiency particularly in utility vehicles, so that for this only two shifting units are needed.

A "shifting unit" is understood to be a device which, at least in one of its shift positions, connects two shafts to one another in a rotationally fixed manner and in another shift position decouples the shafts from one another so that they can rotate relative to one another. Thus, in a closed condition of a shifting element of the shifting unit two shafts are connected rotationally fixed to one another, whereas in an open condition of a shifting element or in a neutral position of the shifting unit the shafts can have different rotation speeds and/or rotation directions. In particular, a shifting unit can contain several shifting elements and can be designed to connect two shafts with interlock or by frictional means. Preferably the shifting elements are designed to interlock, since the shifting unit will then be more compact and more efficient than a shifting element with frictional shifting elements.

In the context of the invention a "shaft" is understood to be a component of the transmission that can rotate, by way of which associated components of the transmission are connected rotationally fixed with one another or by way of which a connection of that type can be formed when one of the shifting units is actuated. The shaft concerned can connect the said components to one another axially or radially or even both axially and radially. Thus, the shaft concerned can also be present as an intermediate component by way of which a component can be connected, for example radially. The term "shaft" does not exclude that the components to be connected can be made integrally, as one piece. In particular, two shafts connected rotationally fixed to one another can be made integrally.

The first electric machine is connected via the first transmission input shaft. Preferably, the rotor shaft of the first electric machine is drivingly connected via a first spur gear stage to the first transmission input shaft. The first spur gear stage comprises a gearwheel arranged rotationally fixed on the first transmission input shaft, which meshes with a gearwheel arranged rotationally fixed on the rotor shaft of the first electric machine, and produces an axial offset between the rotation axis of the transmission and the rotation axis of the first electric machine. The size of the axial offset can be adapted by way of the two gearwheel diameters of the first spur gear stage, so that the first electric machine can be positioned freely in the tangential direction around the transmission.

The second electric machine is connected via the second transmission input shaft. Preferably, the rotor shaft of the second electric machine is drivingly connected via a second spur gear stage to the second transmission input shaft. The second spur gear stage comprises a gearwheel arranged rotationally fixed on the second transmission input shaft, which meshes with a gearwheel arranged rotationally fixed on the rotor shaft of the second electric machine, and produces an axial offset between the rotation axis of the transmission and the rotation axis of the second electric machine. The size of the axial offset can be adapted by way of the two gearwheel diameters of the second spur gear stage, so that the second electric machine can be positioned freely in the tangential direction around the transmission.

The differential is drivingly connected to the transmission via the transmission output shaft. "Drivingly connected" means a connection between two elements or between two devices or between an element and a device, which can be made directly, i.e. without any additional elements and/or devices, or indirectly, i.e. with the involvement of further elements or devices.

The first planetary gearset comprises three elements, wherein the first element of the first planetary gearset is preferably in the form of a sun gear shaft, the second element of the first planetary gearset is preferably in the form of a ring gear shaft, and the third element of the first planetary gearset is preferably in the form of a web shaft or planetary carrier. Preferably, a plurality of planetary gearwheels is mounted to rotate on the web shaft by means of respective planetary bolts, the said planetary gearwheels meshing with the sun gear shaft and with the ring gear shaft. In particular, the first planetary gearset serves as a superimposition gearset by virtue of which the drive powers of the two electric machines are superimposed in the planetary gearset and distributed by the differential to the drive wheels of the vehicle.

When two of the three elements of the first planetary gearset are connected rotationally fixed to one another the first planetary is blocked and thus acts as a direct drive. Owing to the blocking of the first planetary gearset in the second shift position of the first shifting device, the gear ratio is i=1 independently of the number of teeth of the elements meshing with one another. To put it differently, the first planetary gearset rotates as a block. Preferably, the first planetary gearset is blocked when the ring gear shaft of the first planetary gearset and the web shaft of the first planetary gearset are connected rotationally fixed with one another by means of the first shifting device.

In a first shift position of the first shifting unit a second element of the first planetary gearset is connected to a rotationally fixed component. Preferably, the ring gear shaft of the first planetary gearset is connected to a rotationally fixed component by the first shifting device, i.e. immobilized.

The "rotationally fixed component" of the transmission can preferably be a permanently immobilized component, preferably a housing of the transmission, part of such a housing, or a structural element connected rotationally fixed thereto. If an element of a transmission component, such as an element of a planetary gearset, is permanently fixed or temporarily fixed to a rotationally fixed component by means of a shifting element, then it is permanently or temporarily prevented from rotating.

Preferably, in a first gear the shifting unit is in the first shift position whereas the second shifting unit can be in any arbitrary shift position, while in a second gear the second shifting unit is in the second shift position whereas the first shifting unit is in the neutral position, and in a third gear the first shifting unit is in the second shift position whereas the second shifting unit is in any arbitrary shift position. In the first and third gears, depending on the traction force demand the vehicle can be propelled by only one electric machine or by both electric machines. To drive using both electric machines the second shifting unit is in the second shift position, so that the two transmission input shafts are connected rotationally fixed with one another. To drive using the first electric machine only the second shifting unit is in the neutral position, whereby the second electric machine is decoupled from the power flow. In the second gear both electric machines have to be used. In this case, owing to the positioning of the first shifting unit in its neutral position the degree of running of the first planetary gearset is increased. If the second shifting unit is changed to the second shift position, the second transmission input shaft is connected at least indirectly via a preliminary gear ratio to the first planetary gearset, so that superimposed operation takes place at the first planetary gearset.

In a preferred embodiment the first shifting unit comprises a first sliding sleeve rotationally fixed to the second element of the first planetary gearset, such that the first sliding sleeve can be displaced to the shift position required by a first actuator. Preferably the first sliding sleeve has claws which, in the gear position concerned, can cooperate, with interlock, with respective corresponding claw teeth on the rotationally fixed element and on the third element of the first planetary gearset. Consequently, the claw teeth on the rotationally fixed element and the claw teeth on the third element of the first planetary gearset are shifting elements which are connected with interlock to the first sliding sleeve in order to obtain the gear position. In particular the first sliding sleeve in the neutral position of the first shifting unit is arranged axially between the first and second shift positions of the first shifting unit, so that a change between the first and second shift positions of the first shifting unit always entails passing through the neutral position of the first shifting unit. Preferably, the first shifting unit comprises an unsynchronized claw clutch. Alternatively, the use of an ordinary, releasable clutch or brake is conceivable.

According to a preferred embodiment, the second shifting unit comprises a second sliding sleeve connected rotationally fixed to the second transmission input shaft, such that the second sliding sleeve can be displaced axially by means of a second actuator to the shift position required. Preferably, the second sliding sleeve has claws which, in the gear position concerned, can cooperate, with interlock, with respective corresponding claw teeth on the first transmission input shaft and on the second element of the first planetary gearset or a shaft drivingly connected thereto. Consequently, the claw teeth on the first transmission input shaft and the claw teeth on the second element of the first planetary gearset or a shaft drivingly connected thereto, are shifting elements which are connected with interlock to the second sliding sleeve in order to obtain the gear position. In particular the second sliding sleeve in its neutral position of the second shifting unit is arranged axially between the first and second shift positions of the second shifting unit, so that a change between the first and second shift positions of the second shifting unit always entails passing through the neutral position of the second shifting unit. Preferably, the second shifting unit comprises an unsynchronized claw clutch. Alternatively, the use of an ordinary, releasable clutch or brake is conceivable.

In a preferred embodiment the transmission comprises a second planetary gearset as a preliminary gear ratio, with a first element, a second element, and a third element, such that the first element of the second planetary gearset can be connected rotationally fixed to the second transmission input shaft by means of the second shifting unit, whereas the second element of the second planetary gearset is connected to a rotationally fixed component and the third element of the second planetary gearset is connected rotationally fixed to the second element of the first planetary gearset. For example, the first element of the second planetary gearset is in the form of a sun gear shaft, the second element of the second planetary gearset is in the form of a ring gear shaft, and the third element of the second planetary gearset is in the form of a web shaft or planetary carrier. Accordingly the sun gear shaft of the second planetary gearset can be connected rotationally fixed to the second transmission input shaft by means of the second shifting unit, whereas the ring gear shaft of the second planetary gearset is connected to a rotationally fixed component in the form of a housing component and the web shaft of the second planetary gearset is connected rotationally fixed to the ring gear shaft of the first planetary gearset.

According to a preferred embodiment, a countershaft is arranged as a preliminary gear ratio between the second transmission input shaft and the first planetary gearset, so that the second element of the first planetary gearset can be connected rotationally fixed to the second transmission input shaft by way of the countershaft and the second shifting unit. By using a countershaft as a preliminary gear ratio, the second planetary gearset can be omitted as a preliminary gear ratio. The countershaft is arranged with its axis parallel to the first planetary gearset and to the two transmission input shafts, and connected by means of two spur gear stages, such that one of the spur gear stages forms the connection to the second shifting unit and the other spur gear stage forms the connection to the ring gear shaft of the second planetary gearset.

According to a preferred embodiment the drive unit further comprises two fixed gear ratio steps for the driving connection of the respective differential output shafts to the associated drive wheels of the drive axles. In other words, the respective differential output shaft is drivingly connected via the associated fixed gear ratio step to the associated drive wheel. Preferably, the respective gear ratio step is in the form of a planetary gearset with a sun gear shaft, a ring gear shaft, and a web shaft. In particular, the respective sun gear shaft of the gear ratio concerned is fixed in an immobile manner on a housing, whereas the respective web shaft of the gear ratio concerned is designed to be connected to the drive wheel of the vehicle. A plurality of planetary gearwheels is mounted to rotate on the web shaft of the gear ratio step concerned.

In a preferred embodiment, the first electric machine, the second electric machine, and the transmission are arranged coaxially with one another. Preferably, at least part of the transmission, for example at least one planetary gearset, or the whole of the transmission, is arranged radially inside one or both electric machines, whereby the drive unit is made more compact, especially in the axial direction.

According to a preferred embodiment the differential input is connected rotationally fixed to the transmission output and the differential is arranged coaxially with the transmission. For example, the differential input shaft is connected rotationally fixed to the web shaft of the first planetary gearset by way of the transmission output shaft. Preferably, one of the two differential output shafts extends axially through the transmission.

According to a preferred embodiment the differential input is drivingly connected via a third spur gear stage to the transmission output shaft and the differential is arranged with its axis parallel to the transmission. The third spur gear stage comprises gearteeth arranged rotationally fixed on the transmission output shaft, which mesh with gearteeth formed rotationally fixed on the differential input, so that there is an axial offset between the rotation axis of the transmission and the rotation axis of the differential. The size of the axial offset can advantageously be adapted by way of the two gearwheel diameters of the third spur gear stage, so that the transmission can be positioned freely in the tangential direction around the differential axis. For example, gearteeth of the third spur gear stage can be formed as circumferential teeth on a differential cage of the differential.

In a preferred embodiment the differential gear system is in the form of a bevel gear differential. A differential in the form of a bevel gear differential comprises two wheel-side drive output elements, specifically a first drive output wheel and a second drive output wheel. The two drive output wheels each mesh with a compensation element. The compensation elements are mounted to rotate, each about its own axis, in a differential cage. Each drive output wheel is connected rotationally fixed to a respective side-shaft. The drive input to the differential takes place via the differential cage. The drive power fed into the differential, i.e. a rotation speed and a torque, is distributed to the side-shafts and transmitted to the drive wheels of the axle. The side-shafts are designed to be functionally connected with the drive wheels of the vehicle. The respective side-shaft can be connected to the drive wheel associated with it either directly, or indirectly by way of a joint, a joint shaft and/or a wheel hub.

The invention also relates to a vehicle comprising a drive axle with two drive wheels and a drive unit according to the invention, wherein the drive unit is arranged fixed to the chassis of the vehicle and the respective drive wheels of the drive axle are drivingly connected to the differential in each case via a joint shaft. In other words, the two electric machines, the transmission and the differential are arranged in fixed positions on the chassis of the vehicle, and the drive power of the electric machines is transmitted to the drive wheels from the differential by way of joint shafts. The joint shafts are designed to compensate relative movements between the drive wheels and the drive unit. Alternatively, the use of rigid shafts, i.e. a combination of the drive unit with a rigid axle, can be considered.

The above definitions and statements about technical effects, advantages and advantageous embodiments of the drive unit according to the invention also apply to the vehicle according to the invention, in particular the drive axle of the vehicle according to the invention.

BRIEF DESCRIPTION OF THE DRAWINGS

Advantageous embodiments of the invention, which are explained below, are illustrated in the drawings, wherein the same or similar elements are denoted by the same indexes and which show.

DETAILED DESCRIPTION

Figure 1:
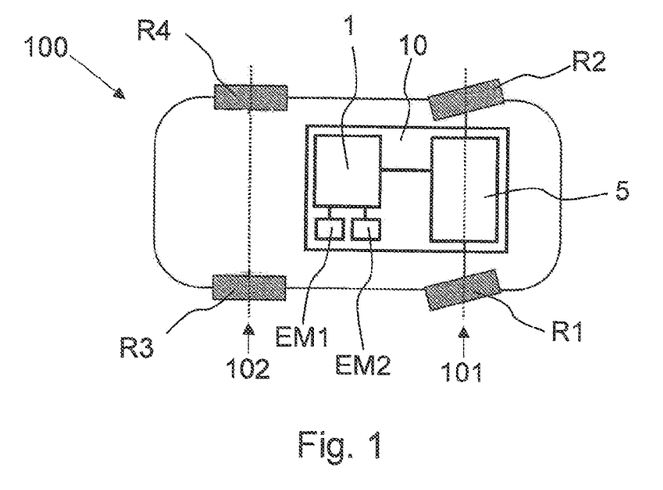
FIG. 1: A greatly simplified schematic view of a vehicle with a drive axle, which comprises a drive unit according to a first embodiment.
Figure 2:
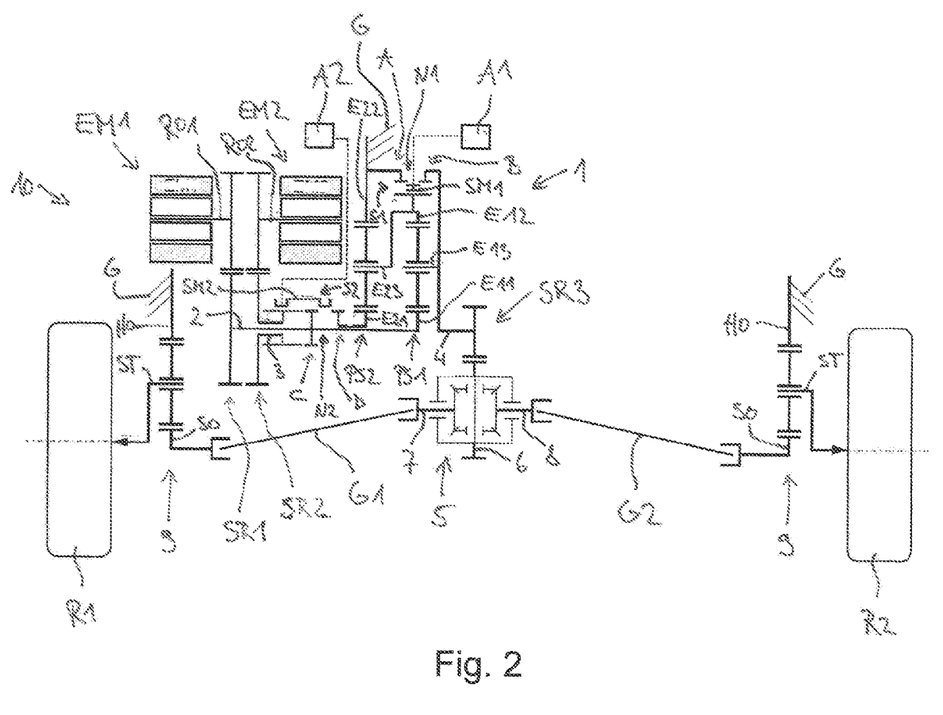
FIG. 2: A greatly simplified schematic view of the drive axle with the drive unit according to the invention, as shown in FIG. 1.

FIG. 1 shows a vehicle 100 according to the invention, in this case in the form of an electric vehicle, comprising a first vehicle axle 101 and a second vehicle axle 102, wherein the first vehicle axle 101 comprises a drive unit 10 according to the invention which is shown in greater detail in FIG. 2. In the present case the first vehicle axle 101 is a front axle, but it can alternatively be a rear axle of the vehicle 100. Moreover, the vehicle 100 can have further vehicle axles. On the first vehicle axle 101 two drive wheels R1, R2 are mounted to rotate, whereas on the second vehicle axle 102 two wheels R3, R4 are fitted and can rotate. The drive unit 10 is arranged fixed to the chassis of the vehicle 100 and comprises a first electric machine EM1, a second electric machine EM2, a differential 5 and a transmission 1, the differential 5 being arranged with its axis parallel to the two electric machines EM1, EM2 and to the transmission 1.

FIG. 2 shows the drive axle with the drive unit 10 according to the invention as shown in FIG. 1. The electric drive axle comprises the two drive wheels R1, R2, the first electric machine EM1 with a first rotor shaft R01, the second electric machine EM2 with a second rotor shaft R02, the transmission 1 and the differential 5.

The transmission 1 is a three-gear transmission and comprises a first transmission input shaft 2 for connecting the first electric machine EM1, a second transmission input shaft 3 for connecting the second electric machine EM2, a transmission output shaft 4 for connecting the differential 5, a first planetary gearset PS1 with a first element E11, a second element E12 and a third element E13, a second planetary gearset PS2 with a first element E21, a second element E22, and a third element E23, a first shifting unit S1 with exactly three shift positions A, B, N1 and a second shifting unit S2 with exactly three shift positions C, D, N2. For the sake of simplicity only half of the two planetary gearsets PS1, PS2 are shown and are coupled with one another.

The first element E11 of the first planetary gearset PS1 is in the form of a sun gear shaft and is connected rotationally fixed to the first transmission input shaft 2. The second element E12 of the first planetary gearset PS1 is a ring gear shaft and is connected rotationally fixed to the third element E23 of the second planetary gearset PS2. The third element E13 of the first planetary gearset PS1 is a web shaft and is in driving connection with the differential input 6.

The first element E21 of the second planetary gearset PS2 is in the form of a sun gear shaft and can be connected rotationally fixed to the second transmission input shaft 3 by means of the second shifting unit S2. The second element E22 of the second planetary gearset PS2 is a ring gear shaft and is connected to a rotationally fixed component G in the form of a housing, so that it is immobilized. The third element E23 of the second planetary gearset PS2 is a web shaft and is connected rotationally fixed to the second element E12, namely the ring gear shaft of the first planetary gearset PS1, whereby the two planetary gearsets PS1, PS2 are coupled to one another.

The first electric machine EM1 is arranged with its axis parallel to the transmission 1 and is drivingly connected to the first transmission input shaft 2 by means of a first spur gear stage SR1. The first spur gear stage SR1 comprises a gearwheel arranged rotationally fixed on the first transmission input shaft 2, which meshes with a gearwheel formed rotationally fixed on the first rotor shaft R01 of the first electric machine EM1, and creates an axial offset between a rotation axis of the transmission 1 and a rotation axis of the first electric machine EM1. The size of the axial offset can be adapted by virtue of the gearwheel diameter of the first spur gear stage SR1, so that the first electric machine EM1 can be positioned freely in the tangential direction around the rotation axis of the transmission 1.

The second electric machine EM2 is arranged with its axis parallel to the transmission 1 and is drivingly connected to the second transmission input shaft 3 by means of a second spur gear stage SR2. The second spur gear stage SR2 comprises a gearwheel arranged rotationally fixed on the second transmission input shaft 3, which meshes with a gearwheel formed rotationally fixed on the second rotor shaft RO2 of the first electric machine EM2, and creates an axial offset between a rotation axis of the transmission 1 and a rotation axis of the second electric machine EM2. The size of the axial offset can be adapted by virtue of the gearwheel diameters of the second spur gear stage SR2, so that the second electric machine EM2 can be positioned freely in the tangential direction around the rotation axis of the transmission 1.

Between the two drive wheels R1, R2 is arranged the differential 5 in the form of an axle differential, with the differential input 6 in the form of a differential cage and two differential output shafts 7, 8. The differential 5 is arranged with its axis parallel to the two electric machines EM1, EM2 and the transmission 1, and the differential input 6 is drivingly connected to the transmission output shaft 4 by means of a third spur gear stage SR3, whereby the transmission output shaft 4 is drivingly connected to the third element E13 of the first planetary gearset PS1. The third spur gear stage SR3 comprises a gearwheel arranged rotationally fixed on the transmission output shaft 4, which meshes with a gearwheel formed rotationally fixed on the differential output 6, and creates an axial offset between the rotation axis of the transmission 1 and a rotation axis of the differential 5. The size of the axial offset can be adapted by virtue of the gearwheel diameters of the third spur gear stage SR3, so that the transmission 1 can be positioned freely in the tangential direction around the rotation axis of the differential 5.

Between the differential 5 and the drive wheels R1, R2 in each case fixed gear ratio steps 9 are arranged in the power flow, in the present case in the form of a planetary gearset arranged on the right and a planetary gearset arranged on the left, which are configured in mirror-image relationship to one another. The respective differential output shaft 7, 8 is drivingly connected via a corresponding joint shaft G1, G2 to a respective sun gear shaft SO of the gear ratio step 9 concerned. In that way relative movements between the respective drive wheel R1, R2 and the drive unit 10 fixed on the chassis can be compensated. A respective ring gear shaft HR of the gear ratio step 9 concerned is immobilized on a rotationally fixed component G, while the drive output takes place via a respective web shaft ST associated with the drive output shafts of the gear ratio steps 9, which drive the drive wheels R1, R2.

The first shifting unit S1 comprises a first sliding sleeve SM1, which is connected rotationally fixed to the second element E12 of the first planetary gearset PS1 in all the shift positions and can be displaced axially to the shift position required by means of a first actuator A1. In a first shift position A of the first shifting unit S1 the second element E12 of the first planetary gearset S1 is connected to a rotationally fixed component G in the form of a housing. For this, for example, a first shifting element of the first shifting unit S1 is closed. In a second shift position B of the first shifting unit S1 two of the three elements of the first planetary gearset PS1 are connected rotationally fixed to one another, in the present case the ring gear shaft and the web shaft of the first planetary gearset PS1. For this, for example, a second shifting element of the first shifting unit S1 is closed. The third shift position N1 of the first shifting unit S1 is a neutral position located between the first and second shift positions A, B of the first shifting unit S1. The shifting elements of the first shifting unit S1 are preferably in the form of unsynchronized claws, although basically frictional, synchronized shifting elements can be used for the shifting functions described.

The second electric machine EM2 can be linked in or decoupled by means of the second shifting unit S2, and in a neutral position of the second shifting unit S2 the second electric machine EM2 decouples the second transmission input shaft 3 and thus too the second electric machine EM2 itself from the drive-train. Consequently, the second shifting unit S2 is designed as a coupling device. The second shifting unit S2 comprises a second sliding sleeve SM2, which in all the shift positions is connected rotationally fixed to the second transmission input shaft 3 and can be displaced axially to the required shift position by a second actuator A2. In a first shift position C of the second shifting unit S2 the first transmission input shaft 2 and the second transmission input shaft 3 are connected rotationally fixed to one another. For this, for example, a first shifting element of the second shifting unit S2 is closed. In a second shift position D of the second shifting unit S2 the second transmission input shaft 3 is connected indirectly by way of the second planetary gearset PS2 to the second element E12 of the first planetary gearset PS1. For this, for example, a second shifting element of the second shifting unit S2 is closed. The third shift position N2 of the second shifting unit S2 is the neutral position, which is located between the first and second shift positions C, D. The shifting elements of the second shifting unit S2 are preferably in the form of unsynchronized claws, although basically frictional, synchronized shifting elements can be used for the shifting functions described.

In a first gear the first shifting unit S1 is in the first shift position A, whereas the second shifting unit S2 can be in any arbitrary shift position C, D or N2. In a second gear the second shifting unit S2 is in its second shift position D and the first shifting unit S1 is in its neutral position. In a third gear the first shifting unit S1 is in its second shift position B while the second shifting unit S2 can be in any arbitrary position C, D or N2. In the first and third gear, depending on the traction force demand the vehicle can be propelled by one or by both electric machines EM1, EM2. For driving with both electric machines EM1, EM2 the second shifting unit S2 is in its first shift position C, so that the two transmission input shafts 2, 3 are connected rotationally fixed to one another. Due to this coupling of the two rotors R01, RO2 the two electric machines EM1, EM2 run at the same rotation speed. The second electric machine EM2 thus boosts the drive input power, which can be doubled if the electric machines EM1, EM2 are of the same design.

For driving with the first electric machine EM1 only, the second shifting unit S2 is in its third shift position N2 so that the second transmission input shaft 3 and hence the second electric machine EM2 are decoupled from the drive input. In the second gear the use of both electric machines EM1, EM2 is necessary. Since the first shifting unit S1 is in its neutral position, the degree of running of the first planetary gearset PS1 is increased. Since the second shifting unit S2 is in the second shift position D, the second transmission input shaft 3 is connected rotationally fixed to the sun gear shaft of the second planetary gearset PS2, which by way of the second planetary gearset PS2 is connected to the ring gear shaft of the first planetary gearset PS1. The result is superimposed operation at the first planetary gearset PS1, this superimposed operation also being known as electro-dynamic driving (EDF).

The working principle of electro-dynamic driving is based on the extension of the transmission by one gear, which is obtained by the superimposed operation at the first planetary gearset PS1. In the present case, for this gear the main drive input, i.e. the first electric machine EM1 is connected to the sun gear shaft of the first planetary gearset PS1 whereas the drive output takes place via the web shaft of the first planetary gearset PS1 to the differential 5. The power train from the second electric machine EM2 is drivingly connected to the ring gear shaft of the first planetary gearset PS1. In accordance with the stationary transmission ratio of the first planetary gearset PS1, the torque of the sun gear shaft of the first planetary gearset PS1 multiplied by the stationary transmission ratio has to be supported by the ring gear shaft. In this case the power train from the second electric machine EM2 serves only to support that torque. If the electric machines EM1, EM2 are of identical design, as they are in the present case, it is advantageous to convert the power from the second electric machine EM2 to supporting the ring gear shaft of the first planetary gearset PS1, i.e. to use the second planetary gearset PS2 as a preliminary gear ratio. With an alternative arrangement of non-identical electric machines EM1, EM2, the electric machine with the higher torque should be connected to the ring gear shaft of the first planetary gearset PS1 (concerning this, see FIG. 6).

When the ring gear shaft is static, the traction force during EDF operation corresponds to that of driving by means of the first electric machine EM1 alone. By virtue of the rotation of the second electric machine EM2 and the resulting rotation of the ring gear shaft of the first planetary gearset PS1, a dynamic rotation speed adaptation of the two part-drives in relation to the drive output rotation speed, i.e. the rotation speed at the web shaft of the first planetary gearset PS1, can take place. With a constant web shaft rotation speed, an increase of the ring gear rotation speed by the second electric machine EM2 results in a reduction of the sun gear shaft rotation speed by the first electric machine EM1. This makes it possible to operate the main drive by the first electric machine EM1 over a broad spectrum of drive output rotation speeds at lower rotation speeds and thus higher torques. Besides increasing the drive torque at a given web shaft rotation speed, the dynamic rotation speed adaptation can also be used for selecting a high-efficiency operating point. This has advantages related to the more sparing use of shifting elements and transmission ratio elements.

In the first gear the first shifting unit S1 is in its first shift position A, so that the ring gear shaft of the first planetary gearset PS1 is connected fixed to the housing. Via the first spur gear stage SR1 the first electric machine EM1 drives the first transmission input shaft 2 and thus also the sun gear shaft of the first planetary gearset PS1, whereas the web shaft of the first planetary gearset PS1 forms the drive output. Further conversions of the drive power take place for all the gears by way of the third spur gear stage SR3 and the gear ratio steps 9. Depending on the traction force demand the second electric machine EM2 can be used, and for that the second shifting unit S2 must be in its first shift position C so that the first transmission input shaft 2 is connected to the second transmission input shaft 3. Alternatively, the second electric machine EM2 can be decoupled from the power flow if the neutral position is engaged in the second shifting unit S2.

If the second electric machine EM2 is used for the drive input in the first gear and the second shifting unit S2 is therefore in its first shift position C, during a gearshift out of the first gear to the second gear the load is first reduced at the second electric machine EM2 in order, then, to change the second shifting unit S2 to the neutral position and brake the second electric machine EM2. The second transmission input shaft 2 is then synchronized with the sun gear shaft of the second planetary gearset PS2, so that the second shifting unit S2 can be changed to its second shift position D.

After that the load is reduced at the second electric machine EM2 until the fixed connection of the ring gear shaft of the first planetary gearset PS1 to the housing by way of the first shift position A of the first shifting unit S1 is free from load. The first shifting unit S1 can then be changed to its neutral position and EDF operation is realized thereby. Consequently, EDF operation takes place in the second gear.

In the second gear, the drive power of the second electric machine EM2 is transformed by the second spur gear stage SR2 and the second planetary gearset PS2, and supplied to the ring gear shaft of the first planetary gearset PS1. Furthermore, the drive power of the first electric machine EM1 is transformed by the first spur gear stage SR1 and supplied to the sun gear shaft of the first planetary gearset PS1. There then takes place a dynamic rotation speed adaptation of the two electric machines EM1, EM2 for maximum traction force.

For a gearshift out of the second gear and into the third gear, by virtue of the dynamic rotation speed adaptation the ring gear shaft and the web shaft of the first planetary gearset PS1 are synchronized and the first shifting unit S1 is changed to its second shift position B, whereby the first planetary gearset PS1 is blocked.

When, for EDF operation, the power train of the second electric machine EM2 comprises a gear ratio step, as the second planetary gearset PS2 in this case, there first takes place a load reduction at the second electric machine EM2 and the second shifting unit S2 is changed to its neutral position, whereby the second electric machine EM2 is decoupled. If the traction force so requires, the two transmission input shafts 2, 3 are synchronized and the second shifting unit S2 is changed to its first shift position C. After this the load at the second electric machine EM2 is reduced. If no preliminary gear ratio is provided between the second spur gear stage SR2 and the first planetary gearset PS1, the second electric machine EM2 can remain coupled to the ring gear shaft of the first planetary gearset PS1 in the third gear and deliver drive power via the said ring gear shaft.

In the third gear the first planetary gearset rotates as a block, and drive power is delivered by the first electric machine EM1 by way of the first transmission input shaft 2. Optionally, the second electric machine EM2 can be coupled or decoupled by means of the second shifting unit S2.

Figure 3:
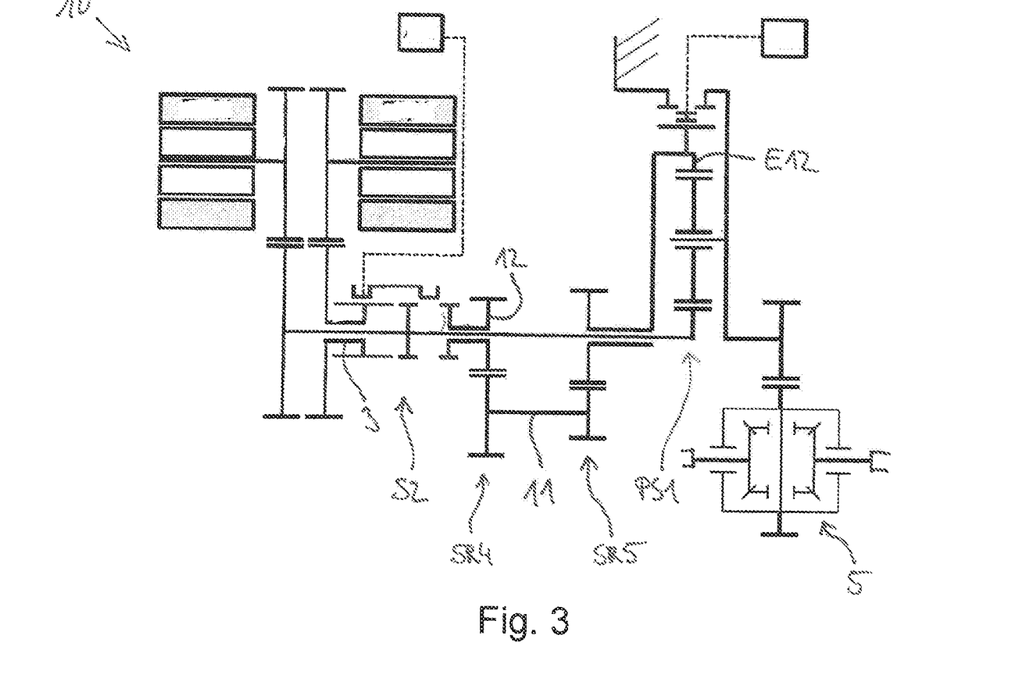
FIG. 3: A greatly simplified schematic view of a drive unit according to the invention, according to a second embodiment.

FIG. 3 shows a second embodiment of a drive unit 10 according to the invention. For simplicity, no more of the structure is shown after the differential 5, but it corresponds to the structure shown in FIG. 2. The drive unit 10 in FIG. 3 corresponds essentially to the drive unit in FIG. 2, the difference between these two embodiments consisting in the arrangement of a countershaft 11 as a preliminary gear ratio and the omission of the second planetary gearset. In this case the countershaft 11 is arranged between the second transmission input shaft 3 and the first planetary gearset PS1, so that the second element E12 of the first planetary gearset PS1 can be connected rotationally fixed to the second transmission input shaft 3 by means of the countershaft 11 and the second shifting unit S2. In particular, the countershaft 11 is drivingly connected via a fourth spur gear stage SR4 to a loose wheel 12 on the first transmission input shaft 2 and via a fifth spur gear stage SR5 to the ring gear shaft of the first planetary gearset PS1, the ring gear shaft being connected rotationally fixed to teeth of the said fifth spur gear stage SR5. In other respects, the example embodiment according to FIG. 3 corresponds to the example embodiment in FIG. 2, to which reference is made.

Figure 4:
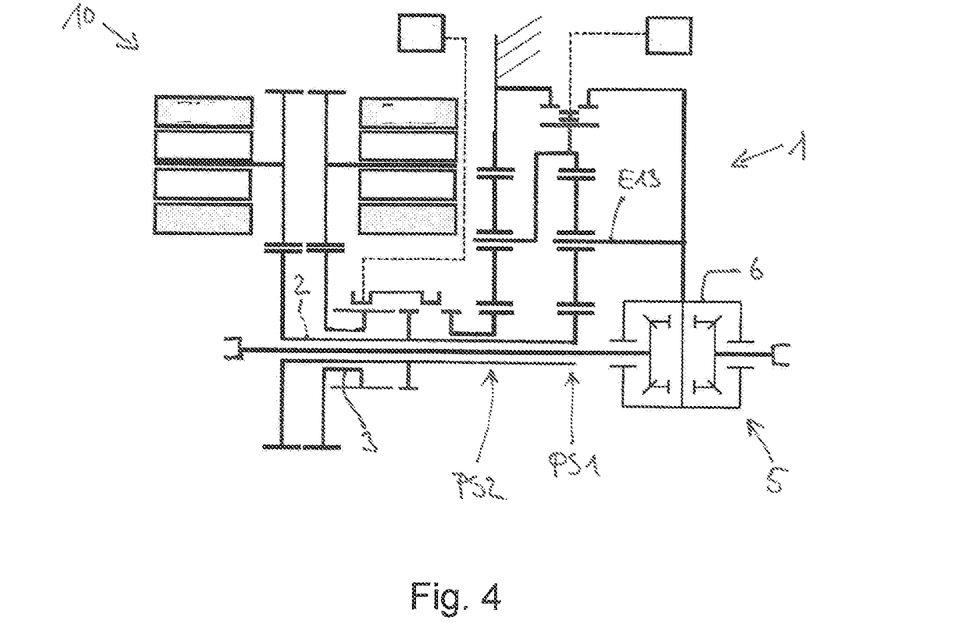
FIG. 4: A greatly simplified schematic view of a drive unit according to the invention, according to a third embodiment.

FIG. 4 shows a third electric machine of a drive unit 10 according to the invention. For simplicity, no more of the structure is shown after the differential 5, but it corresponds to the structure shown in FIG. 2. The drive unit 10 according to FIG. 4 corresponds essentially to the drive unit in FIG. 2, the difference between these two embodiments consisting in the omission of the third spur gear stage. In this case the differential input 6 is connected rotationally fixed to the third element E13 of the first planetary gearset PS1, namely the web shaft, and the differential 5 is arranged coaxially with the transmission 1. The first differential output shaft 7 extends axially through the whole of the transmission 1, and the first transmission input shaft 2, the second transmission input shaft 3 and the two sun gear shafts of the planetary gearsets PS1, PS2 are in the form of hollow shafts. In other respects, the example embodiment of FIG. 4 corresponds to the example embodiment of FIG. 2, to which reference is made.

Figure 5:
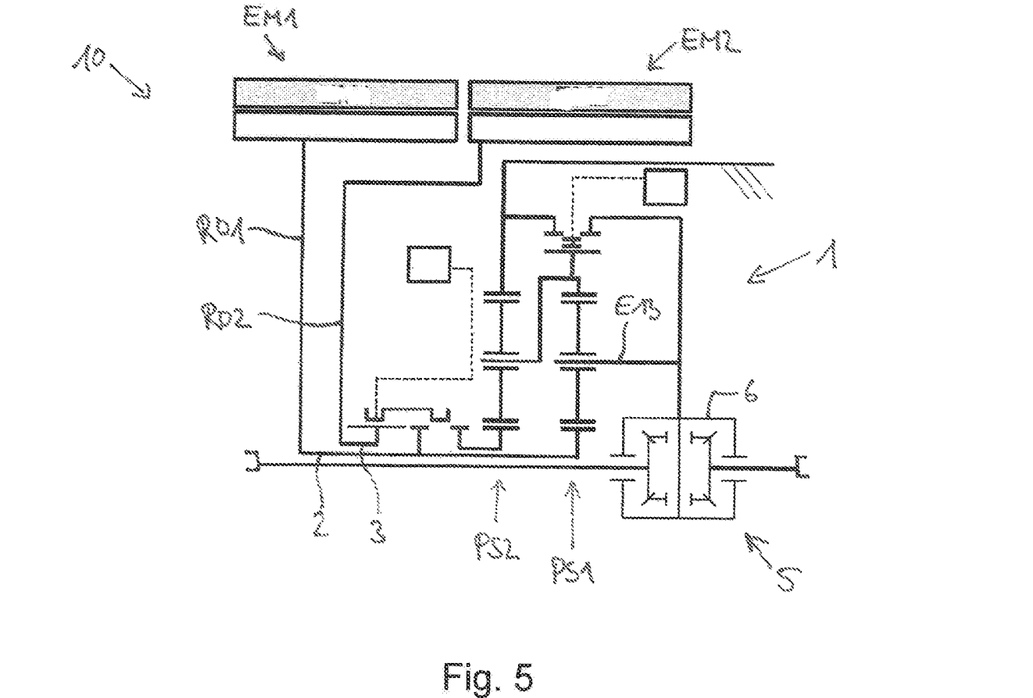
FIG. 5: A greatly simplified schematic view of a drive unit according to the invention, according to a fourth embodiment.

FIG. 5 shows a fourth embodiment of a drive unit 10 according to the invention. For simplicity, no more of the structure is shown after the differential 5, but it corresponds to the structure shown in FIG. 2. The drive unit 10 according to FIG. 4 corresponds essentially to the drive unit in FIG. 2, the difference between these two embodiments consisting in the omission of the first, second and third spur gear stages. In this case the first rotor shaft RO1 of the first electric machine EM1 is connected rotationally fixed to the first transmission input shaft 2, the second rotor shaft RO2 of the second electric machine EM2 is connected rotationally fixed to the second transmission input shaft 3, and the differential input 6 is connected rotationally fixed to the third element E13 of the first planetary gearset PS1, i.e. the web shaft. Consequently, the first electric machine EM1, the second electric machine EM2, the transmission 1 and the differential 5 are arranged coaxially with one another, so that at least the first shifting unit S1 and the first and second planetary gearsets PS1, PS2 are arranged radially inside the second electric machine EM2 in a particularly compact configuration. Furthermore, the second shifting unit S2 and/or the differential 5 can be arranged radially inside the second electric machine EM2. In addition, the second planetary gearset PS2 can be replaced by a countershaft as in FIG. 3. In other respects, the example embodiment of FIG. 5 corresponds to the example embodiment of FIG. 2, to which reference is made.

Figure 6:
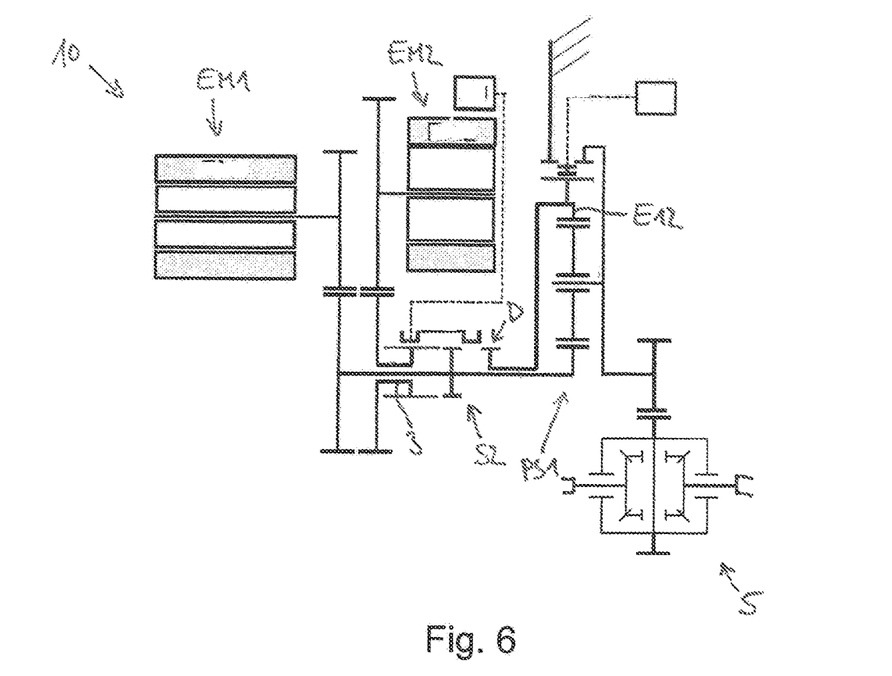
FIG. 6: A greatly simplified schematic view of a drive unit according to the invention, according to a fifth embodiment.

FIG. 6 shows a fifth embodiment of a drive unit 10 according to the invention. For simplicity, no more of the structure is shown after the differential 5, but it corresponds to the structure shown in FIG. 2. The drive unit 10 according to FIG. 6 corresponds essentially to the drive unit 10 in FIG. 2, the difference between these two embodiments consisting in the connection of a second electric machine EM2, which is designed differently from the first electric machine EM1, and the omission of the second planetary gearset. In this case the second electric machine EM2 can generate a higher torque than the first electric machine EM1 and therefore has larger dimensions. If the size of the second electric machine EM2 is sufficiently large, as is the case in this embodiment, a preliminary gear ratio by way of the second planetary gearset can be omitted and the second transmission input shaft 3 can be connected rotationally fixed to the second element E12 of the first planetary gearset PS1 by the second shifting unit S2 in its second shift position D. In other respects, the example embodiment of FIG. 6 corresponds to the example embodiment of FIG. 2, to which reference is made.

INDEXES

1 Transmission
2 First transmission input shaft
3 Second transmission input shaft
4 Transmission output shaft
5 Differential
6 Differential input
7 Differential output shaft
8 Differential output shaft
9 Gear ratio step
11 Drive unit
11 Countershaft
12 Loose wheel
100 Vehicle
101 First vehicle axle
102 Second vehicle axle
R1 Drive wheel
R2 Drive wheel
R3 Wheel
R4 Wheel
EM1 First electric machine
RO1 First rotor shaft
EM2 Second electric machine
RO2 Second rotor shaft
PS1 First planetary gearset
E11 First element of the first planetary gearset
E12 Second element of the first planetary gearset
E13 Third element of the first planetary gearset
PS2 Second planetary gearset
E21 First element of the second planetary gearset
E22 Second element of the second planetary gearset
E23 Third element of the second planetary gearset
SO Sun gear shaft
HO Ring gear shaft
ST Web shaft
S1 First shifting unit
SM1 First sliding sleeve
A First shift position of the first shifting unit
B Second shift position of the first shifting unit
N1 Third shift position of the first shifting unit
S2 Second shifting unit
SM2 Second sliding sleeve
C First shift position of the second shifting unit
D Second shift position of the second shifting unit
N2 Third shift position of the second shifting unit
G Rotationally fixed component
G1 Joint shaft
G2 Joint shaft
A1 First actuator
A2 Second actuator
SR1 First spur gear stage
SR2 Second spur gear stage
SR3 Third spur gear stage
SR4 Fourth spur gear stage
SR5 Fifth spur gear stage

The invention claimed is:

1. A drive unit for a drive axle of a vehicle comprising a first electric machine, a second electric machine, a differential with a differential input and two differential output shafts configured to be drivingly connected with respective drive wheels of the drive axle, and a transmission, the drive unit comprising:
a first transmission input shaft for connection to the first electric machine;
a second transmission input shaft for connection to the second electric machine;
a transmission output shaft for connection to the differential;
at least a first planetary gearset with a first element, a second element and a third element;
a first shifting unit with exactly three shift positions, such that in a first shift position of the first shifting unit, the second element of the first planetary gearset is connected to a rotationally fixed component, in a second shift position of the first shifting unit two of the three elements of the first planetary gearset are connected rotationally fixed to one another, and a third shift position of the first shifting unit is a neutral position; and
a second shifting unit with exactly three shift positions, such that in a first shift position of the second shifting unit the first transmission input shaft and the second transmission input shaft are connected rotationally fixed to one another, in a second shift position of the second shifting unit the second transmission input shaft is connected at least indirectly to the second element of the first planetary gearset, and the third shift position of the second shifting unit is a neutral position.

2. The drive unit according to claim 1, wherein the first shifting unit comprises a first sliding sleeve connected rotationally fixed to the second element of the first planetary gearset, and the first sliding sleeve can be displaced axially by means of a first actuator to the shift position required.

3. The drive unit according to claim 2, wherein the second shifting unit comprises a second sliding sleeve connected rotationally fixed to the second transmission input shaft, and the second sliding sleeve can be displaced axially by means of a second actuator to the shift position required.

4. The drive unit according to claim 1, further comprising a second planetary gearset with a first element, a second element, and a third element, wherein the first element of the second planetary gearset can be connected rotationally fixed to the second transmission input shaft by means of the second shifting unit, the second element of the second planetary gearset is connected to the rotationally fixed component, and the third element of the second planetary gearset is connected rotationally fixed to the second element of the first planetary gearset.

5. The drive unit according to claim 4, wherein the first element of the second planetary gearset is in the form of a sun gear shaft, the second element of the second planetary gearset is a ring gear shaft, and the third element of the second planetary gearset is a web shaft.

6. The drive unit according to claim 1, wherein a countershaft is arranged as a preliminary gear ratio between the second transmission input shaft and the first planetary gearset, and the second element of the first planetary gearset can be connected rotationally fixed to the second transmission input shaft by way of the countershaft and the second shifting unit.

7. The drive unit according to claim 1, further comprising two fixed gear ratio steps for the driving connection of the respective differential output shaft to the associated drive wheels of the drive axle.

8. The drive unit according to claim 1, wherein in a first gear the first shifting unit is in its first shift position and the second shifting unit is in any arbitrary shift position, wherein in a second gear the second shifting unit is in its second shift position and the first shifting unit is in its neutral position, and wherein in a third gear the first shifting unit is in its second shift position while the second shifting unit is in any arbitrary shift position.

9. The drive unit according to claim 1, wherein the first element of the first planetary gearset is configured as a sun gear shaft, the second element of the first planetary gearset is configured as a ring gear shaft, and the third element of the first planetary gearset is configured as a web shaft.

10. The drive unit according to claim 1, wherein the first electric machine is arranged with its axis parallel to the transmission and is drivingly connected to the first transmission input shaft by means of a first spur gear stage.

11. The drive unit according to claim 10, wherein the second electric machine is arranged with its axis parallel to the transmission and is drivingly connected to the second transmission input shaft by means of a second spur gear stage.

12. The drive unit according to claim 1, wherein the first electric machine, the second electric machine, and the transmission are arranged coaxially.

13. The drive unit according to claim 1, wherein the differential input is connected rotationally fixed to the third element of the first planetary gearset and the differential is arranged coaxially with the transmission.

14. The drive unit according to claim 11, wherein the differential input is drivingly connected to the third element of the first planetary gearset by means of a third spur gear stage and the differential is arranged coaxially with the transmission.

15. A vehicle comprising a drive axle with two drive wheels and a drive unit according to claim 1, wherein the drive unit is fixed to the chassis of the vehicle and the respective drive wheels of the drive axle are drivingly connected by way of associated joint shafts to the differential.

* * * * *